United States Patent
Doi

(10) Patent No.: US 10,013,427 B2
(45) Date of Patent: Jul. 3, 2018

(54) ELECTRONIC DEVICE AND RECORDING MEDIUM STORING DATA MANAGEMENT PROGRAM THAT CONCEAL DATA CORRESPONDING TO TYPE OF PROCESSES

(71) Applicant: Kyocera Document Solutions Inc., Osaka (JP)

(72) Inventor: Tomihito Doi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 402 days.

(21) Appl. No.: 14/658,140

(22) Filed: Mar. 14, 2015

(65) Prior Publication Data
US 2015/0261780 A1    Sep. 17, 2015

(30) Foreign Application Priority Data

Mar. 17, 2014 (JP) .................................. 2014-053193

(51) Int. Cl.
*G06F 17/30* (2006.01)
*G06F 21/60* (2013.01)
*G06F 21/78* (2013.01)

(52) U.S. Cl.
CPC .. *G06F 17/30165* (2013.01); *G06F 17/30864* (2013.01); *G06F 21/608* (2013.01); *G06F 21/78* (2013.01)

(58) Field of Classification Search
CPC combination set(s) only.
See application file for complete search history.

(56) References Cited

U.S. PATENT DOCUMENTS

| | | | |
|---|---|---|---|
| 2008/0084576 A1* | 4/2008 | Dantwala | H04N 1/00204 358/1.15 |
| 2008/0189448 A1* | 8/2008 | Souders | G06F 11/00 710/18 |
| 2008/0209143 A1* | 8/2008 | Takahashi | G06F 11/1451 711/162 |
| 2008/0239367 A1* | 10/2008 | Podl | H04N 1/00832 358/1.15 |
| 2008/0304090 A1* | 12/2008 | Shimmoto | G06F 9/485 358/1.13 |
| 2009/0100061 A1 | 4/2009 | Yoshida | |
| 2010/0095354 A1 | 4/2010 | Uchida et al. | |

(Continued)

FOREIGN PATENT DOCUMENTS

| JP | 2003-316588 A | 11/2003 |
|---|---|---|
| JP | 2013-065296 A | 4/2013 |

*Primary Examiner* — Shyue Jiunn Hwa
(74) *Attorney, Agent, or Firm* — James Judge

(57) ABSTRACT

An electronic device includes a first access management circuit and a second access management circuit. The first access management circuit manages an access to a database from a first process. The second access management circuit manages an access to the database from a second process. The first access management circuit, among regions in the database, manages the access to a shared region for data to be used by both of the first process and the second process, and manages the access to a first dedicated region for data to be used by only the first process among the first process and the second process. The second access management circuit manages the access to the shared region among the regions in the database.

9 Claims, 5 Drawing Sheets

(56) References Cited

U.S. PATENT DOCUMENTS

2010/0132026 A1 5/2010 Ferlitsch et al.
2014/0139869 A1* 5/2014 Honma .............. H04N 1/00347
358/1.15

* cited by examiner

ELECTRONIC DEVICE AND RECORDING MEDIUM STORING DATA MANAGEMENT PROGRAM THAT CONCEAL DATA CORRESPONDING TO TYPE OF PROCESSES

INCORPORATION BY REFERENCE

This application is based upon, and claims the benefit of priority from, corresponding Japanese Patent Application No. 2014-053193 filed in the Japan Patent Office on Mar. 17, 2014, the entire contents of which are incorporated herein by reference.

BACKGROUND

Unless otherwise indicated herein, the description in this section is not prior art to the claims in this application and is not admitted to be prior art by inclusion in this section.

A typical electronics device can access the same data from a plurality of processes.

SUMMARY

An electronic device according to one aspect of the disclosure includes a first access management circuit and a second access management circuit. The first access management circuit manages an access to a database from a first process. The second access management circuit manages an access to the database from a second process. The first access management circuit, among regions in the database, manages the access to a shared region for data to be used by both of the first process and the second process, and manages the access to a first dedicated region for data to be used by only the first process among the first process and the second process. The second access management circuit manages the access to the shared region among the regions in the database.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
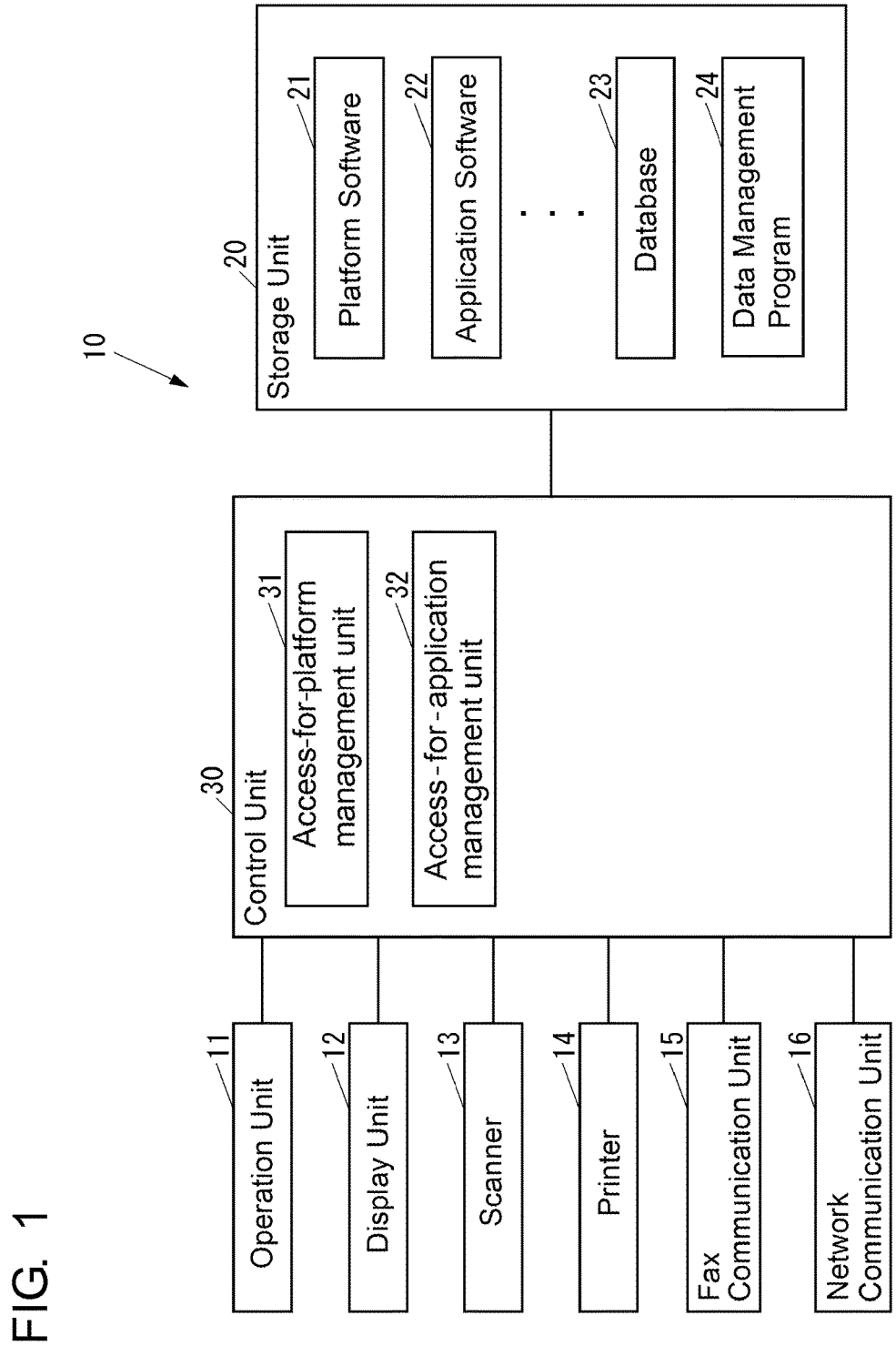
FIG. 1 illustrates a block diagram of an MFP according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a configuration of a Multifunction Peripheral (MFP) as an electronic device according to the embodiment will be described.

FIG. 1 is a block diagram of an MFP 10 according to the embodiment.

As illustrated in FIG. 1, the MFP10 includes an operation unit 11, a display unit 12, a scanner 13, a printer 14, a fax communication unit 15, a network communication unit 16, a storage unit 20, and a control unit 30. The operation unit 11 is an input device such as buttons where various operations by a user are input. The display unit 12 is a display device such as a Liquid Crystal Display (LCD) for displaying various types of information. The scanner 13 is a reading device for reading image data from a document. The printer 14 is a print device for executing a print job on a recording medium such as a paper sheet. The fax communication unit 15 is a fax device for performing fax communication with an external facsimile device (not illustrated) via a communication line such as a dial-up line. The network communication unit 16 is a network communication device for performing communication with an external device via a network such as a Local Area Network (LAN) and the Internet. The storage unit 20 is a non-volatile storage device such as an Electrically Erasable Programmable Read Only Memory (EEPROM) and a Hard Disk Drive (HDD) storing various data. The control unit 30 controls the whole MFP10.

The storage unit 20 stores platform software 21 and application software 22 for operating on the platform software 21. The platform software 21 and the application software 22 are installed on the MFP10 at a production stage of the MFP10.

The platform software 21 is common software to a MFP product series constituted from a plurality of models including the MFP10. The platform software 21 may be produced before individual models of the product series are manufactured. The platform software 21 does not include a function that depends only on the individual models of the product series in order that the plurality of models can be manufactured.

The application software 22 may be produced for only the models to which the MFP10 belongs, among the individual models of the product series. The application software 22 includes the function that depends on the models to which the MFP10 belongs, among the individual models of the product series.

As the application software 22, for example, a plurality of application software is stored in the storage unit 20. The plurality of software includes display application software for controlling a display of a screen by the display unit 12, scan application software for controlling reading of the image data by the scanner 13, print application software for controlling the print job by the printer 14 based on print data received via the network communication unit 16, copy application software controlling the print job by the printer 14 based on the image data read by the scanner 13, fax application software controlling fax communication via the fax communication unit 15, and similar application software.

The storage unit 20 stores a database 23 where data to be used by a first process, that is, the process of the platform software 21 (hereinafter referred to as "platform side process") and data to be used by a second process, that is, the process of the application software 22 (hereinafter referred to as "application side process") are collected.

Figure 2:
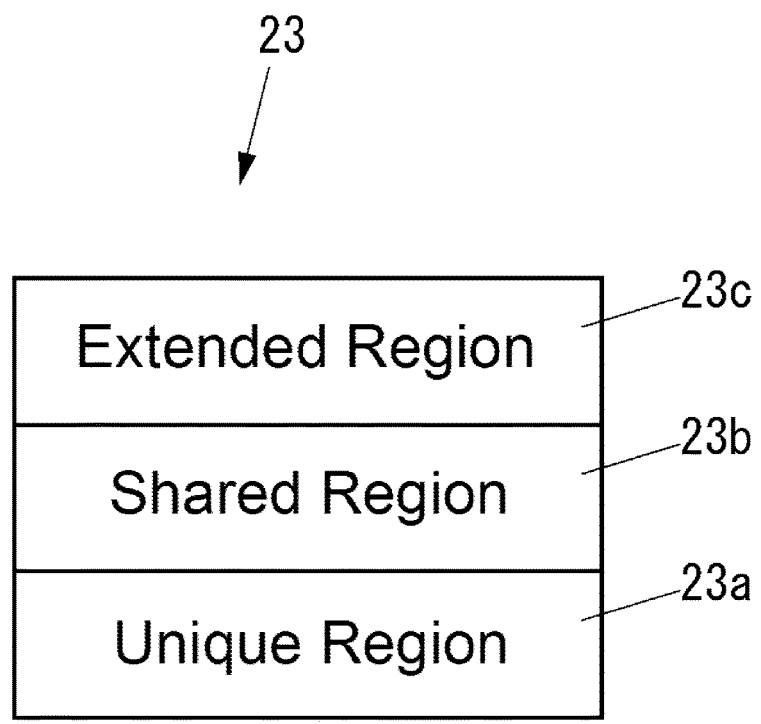
FIG. 2 illustrates respective regions of a database according to the one embodiment.

FIG. 2 illustrates respective regions of the database 23.

As illustrated in FIG. 2, the database 23 is partitioned into a unique region 23a, a shared region 23b, and an extended region 23c. The unique region 23a is a first dedicated region for data to be used by only the platform side process among the platform side process and the application side process. The shared region 23b is a common region for data to be used by both of the platform side process and the application side process. The extended region 23c is a second dedicated region for data to be used by only the application side process among the platform side process and the application side process.

The unique region 23a is the region for confidential data, which is required to be concealed against a user, such as operation parameters required to be separated from the process that the user uses, that is, the application side process.

The shared region 23b is the region where the data can be shared by the platform side process and the application side process.

The extended region 23c is the region that can be freely changed corresponding to the application software 22.

As illustrated in FIG. 1, the storage unit 20 stores a data management program 24 for controlling access to the database 23. The data management program 24 may be installed on the MFP 10 at the production stage of the MFP 10, or may be additionally installed on the MFP 10 from a non-transitory storage medium such as an SD card, a Universal Serial Bus (USB) memory, or may be additionally installed on the MFP 10 via the network.

The control unit 30 is a circuit that includes, for example, a Central Processing Unit (CPU), a Read Only Memory (ROM) storing programs and the various data, and a Random Access Memory (RAM) used as a work area of the CPU. The CPU executes the programs stored in the ROM or the storage unit 20.

The control unit 30 includes a circuit that operates as an access-for-platform management unit 31 and as an access-for-application management unit 32. The access-for-platform management unit 31, by execution of the data management program 24 stored in the storage unit 20, functions as a first access management unit for controlling the access to the database 23 from the platform side process. The access-for-application management unit 32 functions as a second access management unit for controlling the access to the database 23 from the application side process.

Next, an operation of the MFP10 will be described.

In addition, in the following, for ease of understanding of the disclosure, display application software will be described for an example as the application software 22. When the application software 22 is the display application software, items of the data used by the process include, for example, data of a compression method of an image displayed on the display unit 12, data for control of the display unit 12, and data of a layout of a screen displayed on the display unit 12. The data of the compression method of the image displayed on the display unit 12 is, for example, included in the unique region 23a. The data for the control of the display unit 12 is, for example, included in the shared region 23b. The data of the layout of the screen displayed on the display unit 12 is, for example, included in the extended region 23c.

Figure 3:
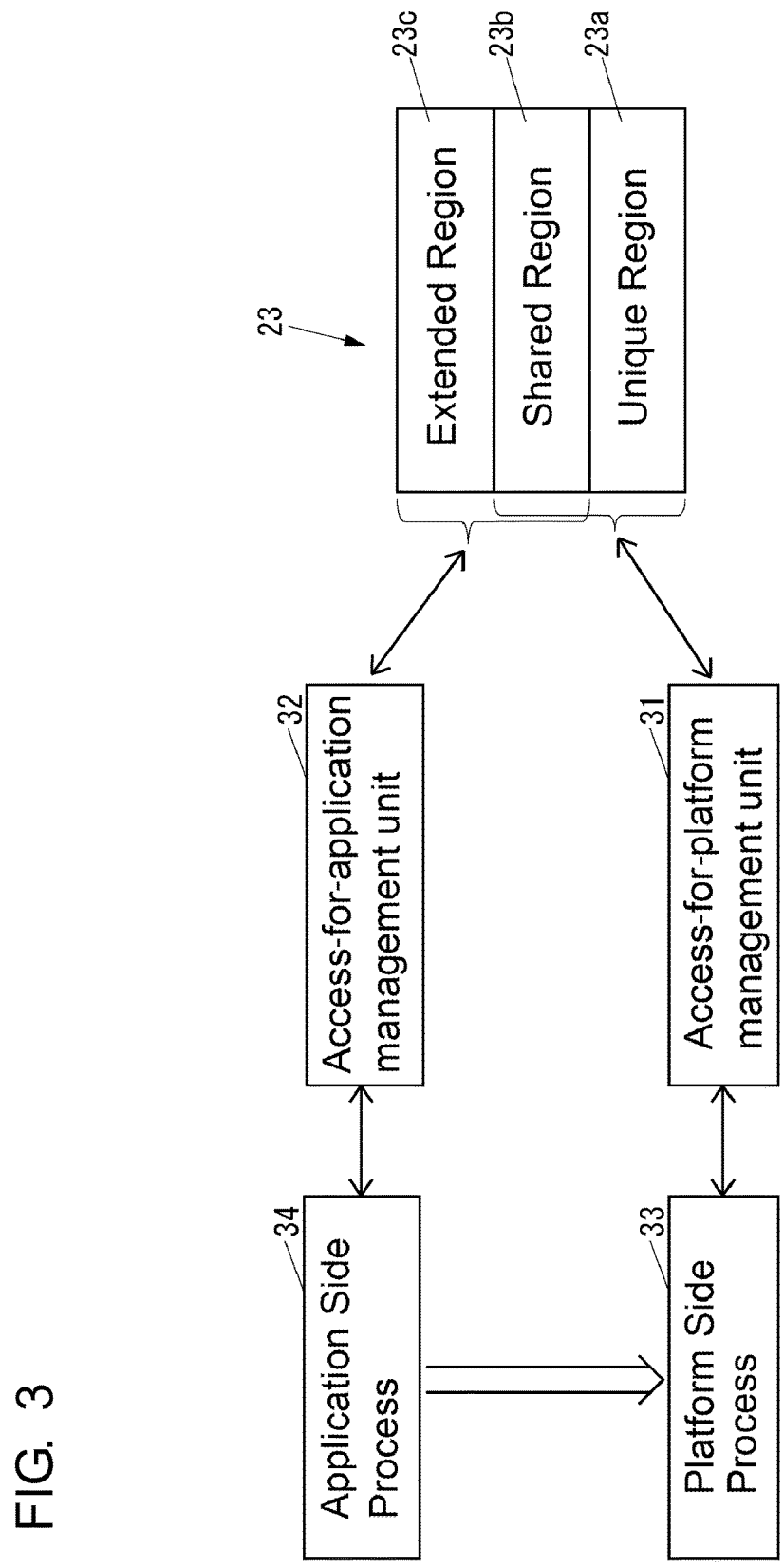
FIG. 3 describes an order of processes of application software by the MFP according to the one embodiment.

FIG. 3 is a diagram describing an order of processes of the application software 22 by the MFP 10.

As illustrated in FIG. 3, the control unit 30 (see FIG. 1) generates a platform side process 33 by executing the platform software 21 (see FIG. 1) and generates an application side process 34 by executing the application software 22 (see FIG. 1).

When the control unit 30 executes the application software 22, a process flows in a way that the application side process 34 uses platform side process 33.

In execution of the process, when the application side process 34 sets the data on the database 23 or acquires the data on the database 23, the application side process 34 notifies the access-for-application management unit 32 of a request for the access to the database 23. Here, the access-for-application management unit 32 maps only the shared region 23b and the extended region 23c among the regions in the database 23 to the RAM of the control unit 30. Accordingly, the application side process 34 can access only the shared region 23b and the extended region 23c among the regions in the database 23. The access-for-application management unit 32 executes the operations illustrated in FIG. 4 when the request for the access to the database 23 is notified from the application side process 34.

Figure 4:
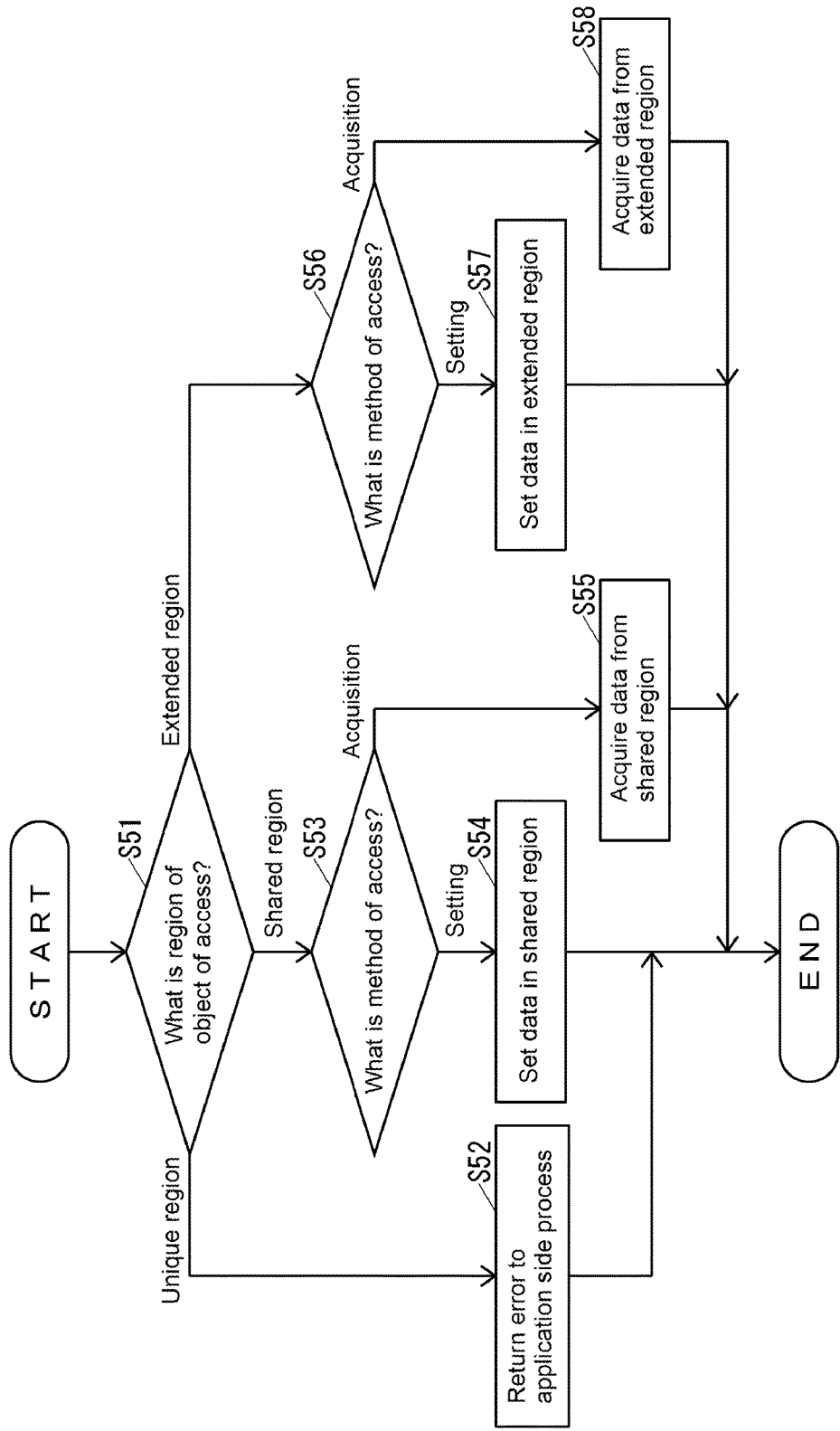
FIG. 4 illustrates an operation of an access-for-application management unit according to the one embodiment.

FIG. 4 is a flowchart of the operation of the access-for-application management unit 32.

As illustrated in FIG. 4, the access-for-application management unit 32 determines whether the region in which the item of the data of an object of the access notified from the application side process 34 is included is any of the unique region 23a, shared region 23b, and the extended region 23c (Step S51).

When the item of the data of the object of the access notified from the application side process 34 is, for example, the data of the compression method of the image displayed on the display unit 12, since the data of the compression method of the image displayed on the display unit 12 is not included in the items of the data in the shared region 23b and the extended region 23c that the access-for-application management unit 32 manages, the access-for-application management unit 32 determines that the region is the unique region 23a at Step S51. Then, the access-for-application management unit 32 returns an error to the application side process 34 (Step S52) and terminates the operation illustrated in FIG. 4. When the error is returned from the access-for-application management unit 32, the application side process 34 executes a specific behavior for the case of the error.

When the item of the data of the object of the access notified from the application side process 34 is, for example, the data for the control of the display unit 12, since the data for the control of the display unit 12 is included in the items of the data in the shared region 23b that the access-for-application management unit 32 manages, the access-for-application management unit 32 determines that the region is the shared region 23b at Step S51. Then, the access-for-application management unit 32 determines whether a method of the access notified from the application side process 34 is any of setting or acquisition (Step S53).

When the access-for-application management unit 32 determines that the method of the access is the setting at Step S53, the access-for-application management unit 32 causes the application side process 34 to set the data in the shared region 23b (Step S54) and terminates the operation illustrated in FIG. 4.

When the access-for-application management unit 32 determines that the method of the access is the acquisition at Step S53, the access-for-application management unit 32 causes the application side process 34 to acquire the data from the shared region 23b (Step S55) and terminates the operation illustrated in FIG. 4.

When the item of the data of the object of the access notified from the application side process 34 is, for example, the data of the layout of the screen displayed on the display unit 12, since the data of the layout of the screen displayed on the display unit 12 is included in the items of the data in the extended region 23c that the access-for-application management unit 32 manages, the access-for-application management unit 32 determines that the region is the extended region 23c at Step S51. Then, the access-for-application management unit 32 determines whether the method of the access notified from the application side process 34 is any of the setting or the acquisition (Step S56).

When the access-for-application management unit 32 determines that the method of the access is the setting at Step S56, the access-for-application management unit 32 causes the application side process 34 to set the data in the extended region 23c (Step S57) and terminates the operation illustrated in FIG. 4.

When the access-for-application management unit 32 determines that the method of the access is the acquisition at Step S56, the access-for-application management unit 32 causes the application side process 34 to acquire the data from the extended region 23c (Step S58) and terminates the operation illustrated in FIG. 4.

The access-for-application management unit 32, as described above, manages the access to the shared region 23b and the extended region 23c among the regions in the database 23.

As illustrated in FIG. 3, in the execution of the process, when the platform side process 33 sets the data on the database 23 or acquires the data on the database 23, the platform side process 33 notifies the access-for-platform management unit 31 of the request for the access to the database 23. Here, the access-for-platform management unit 31 maps only the unique region 23a and the shared region 23b to the RAM of the control unit 30 among the regions in the database 23. Accordingly, the platform side process 33 can access only to the unique region 23a and the shared region 23b among the regions in the database 23. The access-for-platform management unit 31 executes operations illustrated in FIG. 5 when the request for the access to the database 23 is notified from the platform side process 33.

Figure 5:
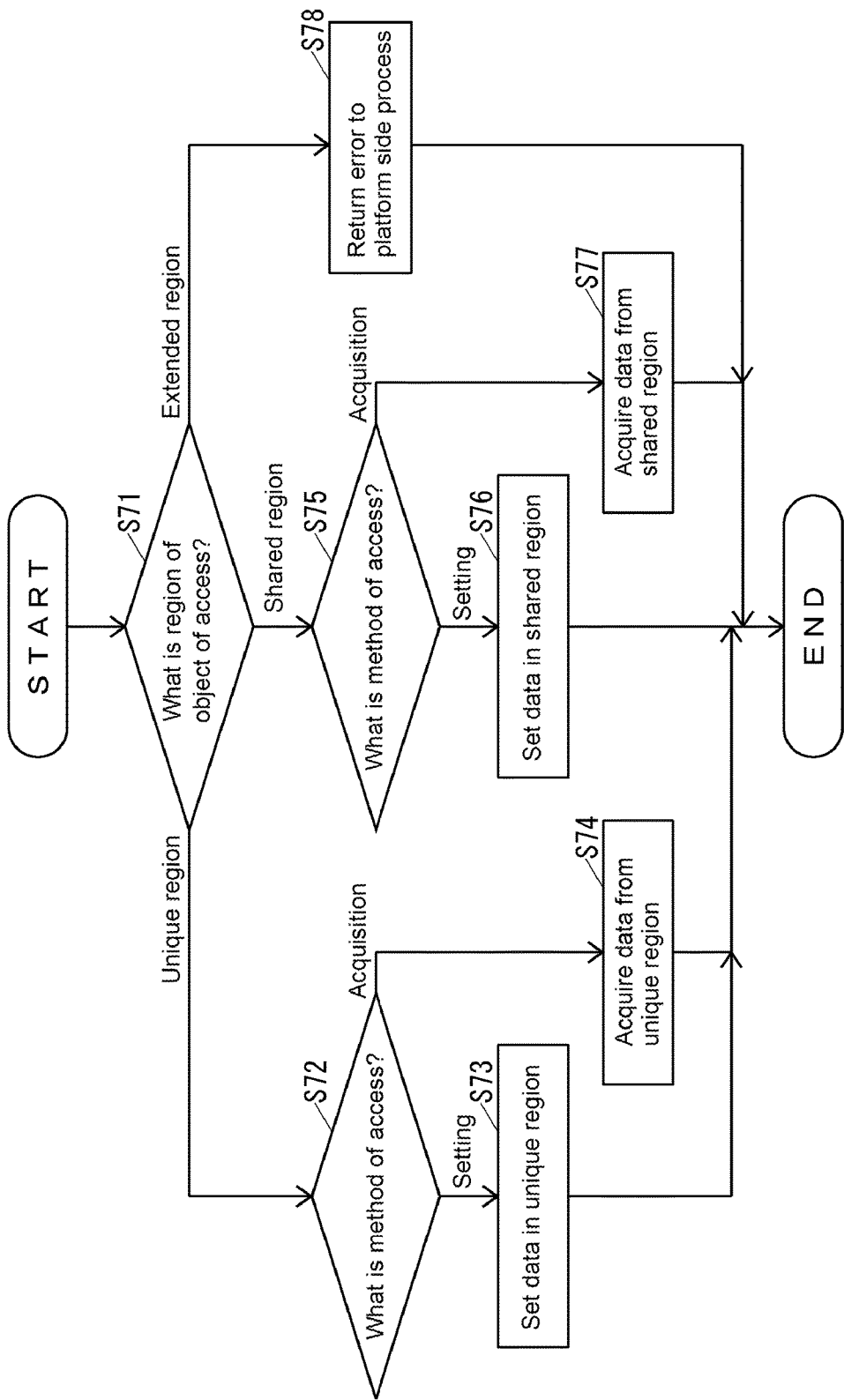
FIG. 5 illustrates an operation of an access-for-platform management unit according to the one embodiment.

FIG. 5 is a flow chart of the operation of the access-for-platform management unit 31.

As illustrated in FIG. 5, the access-for-platform management unit 31 determines whether the region including an item of data of an object of the access notified from the platform side process 33 is any of the unique region 23a, the shared region 23b, and the extended region 23c (Step S71).

When the item of the data of the object of the access notified from the platform side process 33 is, for example, the data of the compression method of the image displayed on the display unit 12, since the data of the compression method of the image displayed on the display unit 12 is included in the items of the data in the unique region 23a that the access-for-platform management unit 31 manages, the access-for-platform management unit 31 determines that the region is the unique region 23a at Step S71. Then, the access-for-platform management unit 31 determines whether a method of the access notified from the platform side process 33 is any of the setting or the acquisition (Step S72).

When the access-for-platform management unit 31 determines that the method of the access is the setting at Step S72, the access-for-platform management unit 31 causes the platform side process 33 to set the data in the unique region 23a (Step S73) and terminates the operation illustrated in FIG. 5.

When the access-for-platform management unit 31 determines that the method of the access is the acquisition at Step S72, the access-for-platform management unit 31 causes the platform side process 33 to acquire the data from the unique region 23a (Step S74) and terminates the operation illustrated in FIG. 5.

When the item of the data of the object of the access notified from the platform side process 33 is, for example, the data for the control of the display unit 12, since the data for the control of the display unit 12 is included in the items of the data in the shared region 23b that the access-for-platform management unit 31 manages, the access-for-platform management unit 31 determines that the region is the shared region 23b at Step S71. Then, the access-for-platform management unit 31 determines whether the method of the access notified from the platform side process 33 is any of the setting or the acquisition (Step S75).

When the access-for-platform management unit 31 determines that the method of the access is the setting at Step S75, the access-for-platform management unit 31 causes the platform side process 33 to set the data in the shared region 23b (Step S76) and terminates the operation illustrated in FIG. 5.

When the access-for-platform management unit 31 determines that the method of the access is the acquisition at Step S75, the access-for-platform management unit 31 causes the platform side process 33 to acquire the data from the shared region 23b (Step S77) and terminates the operation illustrated in FIG. 5.

When the item of the data of the object of the access notified from the platform side process 33 is, for example, the data of the layout of the screen displayed on the display unit 12, since the data of the layout of the screen displayed on the display unit 12 is not included in the items of the data in the unique region 23a and the shared region 23b that the access-for-platform management unit 31 manages, the access-for-platform management unit 31 determines that the region is the extended region 23c at Step S71. Then, the access-for-platform management unit 31 returns an error to the platform side process 33 (Step S78) and terminates the operation illustrated in FIG. 5. When the error is returned from the access-for-platform management unit 31, the platform side process 33 executes a specific behavior for the case of the error.

The access-for-platform management unit 31, as described above, manages the access to the unique region 23a and the shared region 23b among the regions in the database 23.

As described above, since the MFP 10 permits the access to the unique region 23a only from the platform side process 33 (Steps S73 and S74), the data on the unique region 23a can be concealed against the application side process 34. Namely, the MFP 10 can conceal the data corresponding to the type of the process.

Especially, since the MFP 10, among the platform software 21 and the application software 22, can conceal the data to be used by the process of the platform software 21, that is, only the platform side process 33, against the process of the application software 22 used directly by a user, that is, the application side process 34. Thus, the confidential data can be concealed against the user. For example, when the data of the compress method of the image displayed on the display unit 12 is important data to be confidential against the user, the manufactures of the MFP 10, in the product series of the MFP 10 constituted of a plurality of models including the MFP 10, designs the MFP 10 such that the data of the compress method of the image displayed on the display unit 12 so as to be arranged in the unique region 23*a*. This can conceal the data of the compress method of the image displayed on the display unit 12 against the user.

Since the MFP10 permits the access to the extended region 23*c* only from the process of the application software 22, that is, the application side process 34, the MFP 10 can employ specific data for the application software 22 as the definition of the data stored on the extended region 23*c* regardless of the platform software 21. That is, the MFP 10 can extend the definition of the data used by the process corresponding to the application software 22. For example, the manufacture of the MFP 10 can change the data of the layout of the screen displayed on the display unit 12 to the data specific to the model to which the MFP 10 belongs among the product series of the MFP 10 constituted of a plurality of models including the MFP 10. Further, while the manufacture of the MFP 10 cannot change a data type, such as an integer type, a character type, with respect to the data in the unique region 23*a* used only by the platform side process 33 or the data in the shared region 23*b* used by not only the application side process 34 but also the platform side process 33, the manufacture of the MFP 10 can change the data type with respect to the data in the extended region 23*c* used only by the application side process 34 corresponding to the application software 22.

Since the shared region 23*b* is located on the database 23, the MFP 10 ensures that the data, which is necessary when the application side process 34 requests a process to the platform side process 33, is smoothly transmitted from the application side process 34 to the platform side process 33 via the shared region 23*b*. Further, the MFP 10 ensures that the data on the shared region 23*b*, which is changed by the platform side process 33, is referred to from the application side process 34.

The electronic device of the disclosure is the MFP in the embodiment. However, as long as the electronic device is an electronic device performing access to a database, the electronic device may be an image forming apparatus, such as a printer-only machine, a copy-only machine, a FAX-only machine, other than the MFP; or may be an electronic device, such as a Personal Computer (PC), other than the image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device comprising:
a first access management circuit that manages access to a database from a multifunction peripheral (MFP) platform software process;
a second access management circuit that manages access to the database from an application-software process operating on the MFP platform software; and
a memory serving as a work area for the first access management circuit and the second access management circuit; wherein
the first access management circuit, on being notified through the MFP platform-software process of a request for access to the database when the MFP platform-software process, executing processing, is to access data in the database, maps a shared region, among regions in the database, for data used by both the MFP platform-software process and the application-software process, and maps a unique region for data used by the MFP platform-software process alone, of the MFP platform-software and application-software processes, to the memory serving as the work area, determines whether any region including a data item that is the target of the access request reported through the MFP platform-software process is the unique region, the shared region, or the extended region, and when the region including the data item that is the target of the access request is the unique region, causes the MFP platform-software process to access the unique region, when the region including the data item that is the target of the access request is the shared region, causes the MFP platform-software process to access the shared region, and when the region including the data item that is the target of the access request is the extension region, returns an error message to the MFP platform software process, and
the second access management circuit, on being notified through the application-software process of a request for access to the database when the application-software process, executing processing, is to access data in the database, maps the shared region among regions in the database, and an extension region for data used by the application software process alone, of the MFP platform-software and application-software processes, to the memory serving as the work area, determines whether any region including the data item that is the target of the access request reported through the application-software process is the unique region, the shared region, or the extension region, and when the region including the data item that is the target of the access request is the extension region, causes the application-software process to access the extension region, when the region including the data item that is the target of the access request is the shared region, causes the application-software process to access the shared region, and when the region including the data item that is the target of the access request is the unique region, returns an error message to the application-software process.

2. The electronic device according to claim 1, wherein:
the unique region is for confidential data required to be concealed from a user; and
the extension region is configured to enable the extension region to be freely changed in accordance with the application software.

3. The electronic device according to claim 2, wherein the confidential data includes MFP platform-operational parameters required to be isolated from the application-software process.

4. A non-transitory computer-readable recording medium storing a data management program to control an electronic device, the electronic device having a memory, the data management program causing the electronic device to function as:

a first access management unit that manages access to a database from a multifunction peripheral (MFP) platform-software process; and a second access management unit that manages access to the database from an application-software process operating on the MFP platform software; wherein the electronic device's memory serves as a work area for the first access management unit and the second access management unit, the first access management circuit, on being notified through the MFP platform-software process of a request for access to the database when the MFP platform-software process, executing processing, is to access data in the database, maps a shared region, among regions in the database, for data used by both the MFP platform-software process and the application-software process, and maps a unique region for data used by the MFP platform-software process alone, of the MFP platform-software and application-software processes, to the memory as the work area, determines whether any region including a data item that is the target of the access request reported through the MFP platform-software process is the unique region, the shared region, or the extended region, and when the region including the data item that is the target of the access request is the unique region, causes the MFP platform-software process to access the unique region, when the region including the data item that is the target of the access request is the shared region, causes the MFP platform-software process to access the shared region, and when the region including the data item that is the target of the access request is the extension region, returns an error message to the MFP platform software process, and the second access management circuit, on being notified through the application-software process of a request for access to the database when the application-software process, executing processing, is to access data in the database, maps the shared region among regions in the database, and an extension region for data used by the application-software process alone, of the MFP-platform-software and application-software processes, to the memory as the work area, determines whether any region including the data item that is the target of the access request reported through the application-software process is the unique region, the shared region, or the extension region, and when the region including the data item that is the target of the access request is the extension region, causes the application-software process to access the extension region, when the region including the data item that is the target of the access request is the shared region, causes the application software process to access the shared region, and when the region including the data item that is the target of the access request is the unique region, returns an error message to the application-software process.

5. The non-transitory computer-readable recording medium according to claim 4, wherein:
the unique region is for confidential data required to be concealed from a user; and
the extension region is configured to enable the extension region to be freely changed in accordance with the application software.

6. The non-transitory computer-readable recording medium according to claim 5, wherein the confidential data includes MFP platform-operational parameters required to be isolated from the application-software process.

7. A method for managing data in an electronic device having a memory serving as a work area, the data-managing method comprising:
managing access to a database from a multifunction peripheral (MFP) platform-software process; and
managing access to the database from an application-software process operating on the MFP platform software; wherein
the managing of access from the MFP platform-software process, in response to the MFP platform-software process sending out a request for access to the database when the MFP platform-software process, executing processing, is to access data in the database, maps a shared region, among regions in the database, for data used by both the MFP platform software process and the application software process, and maps a unique region for data used by the MFP platform-software process alone, of the MFP platform-software and application-software processes, to the memory serving as the work area, determines whether any region including a data item that is the target of the access request sent out from the MFP platform-software process is the unique region, the shared region, or the extended region, and when the region including the data item that is the target of the access request is the unique region, causes the MFP platform-software process to access the unique region, when the region including the data item that is the target of the access request is the shared region, causes the MFP platform-software process to access the shared region, and when the region including the data item that is the target of the access request is the extension region, returns an error message to the MFP platform software process, and the managing of access from the application-software process, in response to the application-software process sending out a request for access to the database when the application-software process, executing processing, is to access data in the database, maps the shared region among regions in the database, and an extension region for data used by the application-software process alone, of the MFP-platform-software and application-software processes, to the memory serving as the work area, determines whether any region including the data item that is the target of the access request sent out from the application-software process is the unique region, the shared region, or the extension region, and when the region including the data item that is the target of the access request is the extension region, causes the application-software process to access the extension region, when the region including the data item that is the target of the access request is the shared region, causes the application-software process to access the shared region, and when the region including the data item that is the target of the access request is the unique region, returns an error message to the application-software process.

8. The data-managing method according to claim 7, wherein:
the unique region is for confidential data required to be concealed from a user; and
the extension region is configured to enable the extension region to be freely changed in accordance with the application software.

9. The data-managing method according to claim 8, wherein the confidential data includes MFP platform-operational parameters required to be isolated from the application-software process.

\* \* \* \* \*